(12) United States Patent
Pandis et al.

(10) Patent No.: US 12,189,649 B2
(45) Date of Patent: Jan. 7, 2025

(54) SCALING DATABASE QUERY PROCESSING USING ADDITIONAL PROCESSING CLUSTERS

(71) Applicant: Amazon Technologies, Inc., Seattle, WA (US)

(72) Inventors: Ippokratis Pandis, Menlo Park, CA (US); Naresh Chainani, Mountain View, CA (US); Sebastian Hillig, Berlin (DE); Christos Stavrakakis, Berlin (DE); Eric Ray Hotinger, Redmond, WA (US); Bruce William McGaughy, Mercer Island, WA (US); William Michael McCreedy, Berlin (DE); Yan Leshinsky, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 17/535,446

(22) Filed: Nov. 24, 2021

(65) Prior Publication Data

US 2023/0161792 A1 May 25, 2023

(51) Int. Cl.
*G06F 16/27* (2019.01)
*G06F 16/2453* (2019.01)

(52) U.S. Cl.
CPC ........ *G06F 16/27* (2019.01); *G06F 16/24542* (2019.01)

(58) Field of Classification Search
CPC .............................. G06F 16/27; G06F 16/24542
See application file for complete search history.

(56) References Cited

U.S. PATENT DOCUMENTS

| 9,141,648 | B1* | 9/2015 | Birnbaum ......... G06F 16/24552 |
| 11,138,214 | B2 | 10/2021 | Rosen et al. |
| 2015/0339486 | A1* | 11/2015 | Shetye .................... H04L 67/02 726/28 |
| 2017/0083588 | A1* | 3/2017 | Lang ................. G06F 16/24526 |
| 2018/0246957 | A1 | 8/2018 | Ago et al. |
| 2019/0147084 | A1 | 5/2019 | Pal et al. |

(Continued)

OTHER PUBLICATIONS

U.S. Appl. No. 17/547,831, filed Dec. 10, 2021, Gaurav Saxena, et al.

(Continued)

*Primary Examiner* — Apu M Mofiz
*Assistant Examiner* — Farhad Agharahimi
(74) *Attorney, Agent, or Firm* — S. Scott Foster; Kowert, Hood, Munyon, Rankin & Goetzel, P.C.

(57) ABSTRACT

Database query processing may be scaled using additional processing clusters. A database query is received at a processing cluster. A determination is made as to whether additional processing clusters will be used to process the database query. Operations to cause compute nodes of the processing cluster to instruct operations at the additional processing clusters are included in a plan generated to perform database queries determined to use additional processing clusters. The plan is executed to be perform the database query causing compute nodes of the processing cluster to send instructions to corresponding additional processing clusters in order to generate and return a response to the database query.

20 Claims, 9 Drawing Sheets

(56) References Cited

U.S. PATENT DOCUMENTS

2020/0050694 A1* 2/2020 Avalani .................. G06F 16/25

OTHER PUBLICATIONS

U.S. Appl. No. 17/535,940, filed Nov. 26, 2021, Ippokratis Pandis, et al.
International Search Report and Written Opinion mailed Mar. 20, 2023 in International Application No. PCT/US2022/080421, Amazon Technologies, Inc., pp. 1-12.
Gupta Anurag, et al, "Amazon Redshift and the Case for Simpler Data Warehouses", Proceedings of the 2015 ACM SIGMOD international conference on management of data (SIGMOD '15), pp. 1917-1923, May 27, 2015, ACM Press, New York, New York, USA.
Le Pape, Cecile, et al: "Replica Refresh Strategies in a Database Cluster", High Performance Computing for Computational Science—VECPAR 2006: 7th International Conference, Rio de Janeiro, Brazil, Jun. 10-13, 2006, pp. 679-691, Revised Selected and Invited Papers 7, Springer Berlin Heidelberg, 2007.

* cited by examiner

SCALING DATABASE QUERY PROCESSING USING ADDITIONAL PROCESSING CLUSTERS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, given that many workloads are unknown when data processing resources are configured, or change over time. Challenges in obtaining the right configuration of data processing resources occur frequently.

Figure 1:
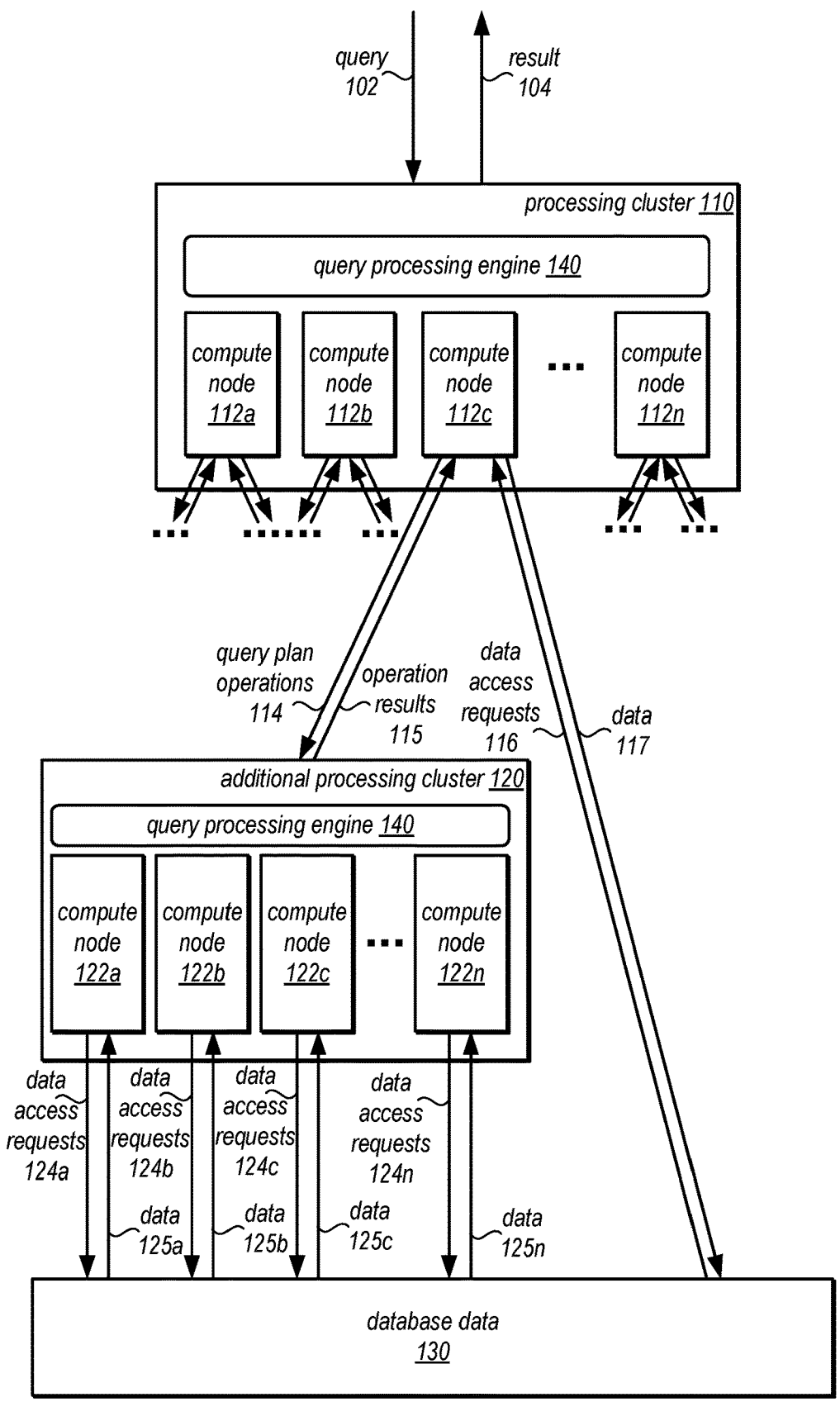
FIG. 1 illustrates a logical block diagram of scaling database query processing using additional processing clusters, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of scaling database query processing using additional processing clusters, according to some embodiments, according to some embodiments are described herein. Database queries for data that satisfy various conditions or criteria, insertions, deletions, modifications, or any other request triggering processing based on a request to access a data store may utilize varying amounts of processing resources, including various central processing units (CPUs), graphical processing units (GPUs), or other processing components that may execute various tasks to process database queries, in some embodiments. Because database queries may vary in terms of the workload placed upon the processing resources to execute the database query, the amount of processing resources that any one query engine may provide could be inadequate (or underutilized) to meet the demands of some query workloads.

One approach to scaling resources to meet query workloads could be to utilize a different set of computing resources (e.g., an entirely different cluster of computing resources). However, such techniques may optimize the performance of queries to a database overall (e.g., multiple queries from one or multiple users), and such a scaling technique may not improve the performance of an individual database query. Techniques for scaling database query processing using additional processing clusters may allow database systems, including providers of a database services, to automatically adapt to query workloads, so that query performance for individual queries is achieved (which allows for good client application performance of client applications that utilize the database service) as the resources of the processing cluster that is handling a query can be expanded when optimal to utilize additional query processing resources.

FIG. 1 illustrates a logical block diagram of scaling database query processing using additional processing clusters, according to some embodiments, according to some embodiments. A database system that hosts a database may utilize a processing cluster, such as processing cluster 110, to receive database queries 102, perform the database queries and return a result 104. Such a database system may be a stand-alone system, in various embodiments. For example, the database system may be implemented for private use (e.g., on private networks and resources for entity-specific utilization). In some embodiments, the database system may be a database service, which may be implemented as part of multiple different services provided by a cloud service provider, such as provider network 200 discussed in detail below with regard to FIG. 2.

Processing cluster 110 may utilize parallelization of work query performance work by distributing the workload of performing a query across multiple compute nodes, such as compute nodes 112a, 112b, 112c, and 112n, using a common query processing engine 140 (e.g., a database management system and storage engine that supports distributed query execution in cluster 110). Although not depicted in FIG. 1, processing cluster 110 may implement a leader node, as described in detail below with regard to FIGS. 3-5, although leader-node less architectures may also be implemented in other embodiments of processing cluster 110).

Figure 7:
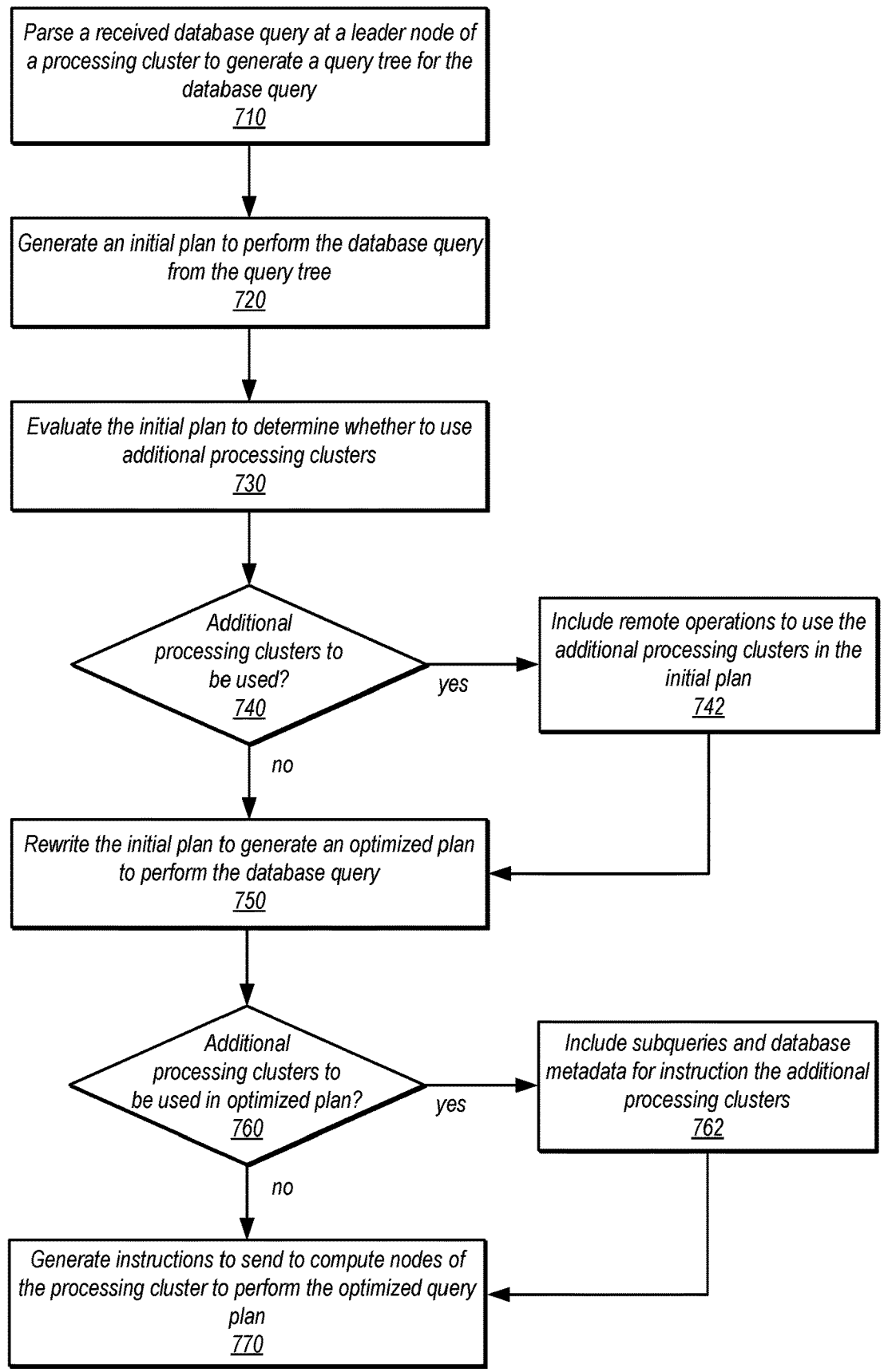
FIG. 7 is a high-level flowchart illustrating methods and techniques to implement generating a plan a leader node of processing cluster to perform a database query using additional processing clusters, according to some embodiments.
Figure 8:
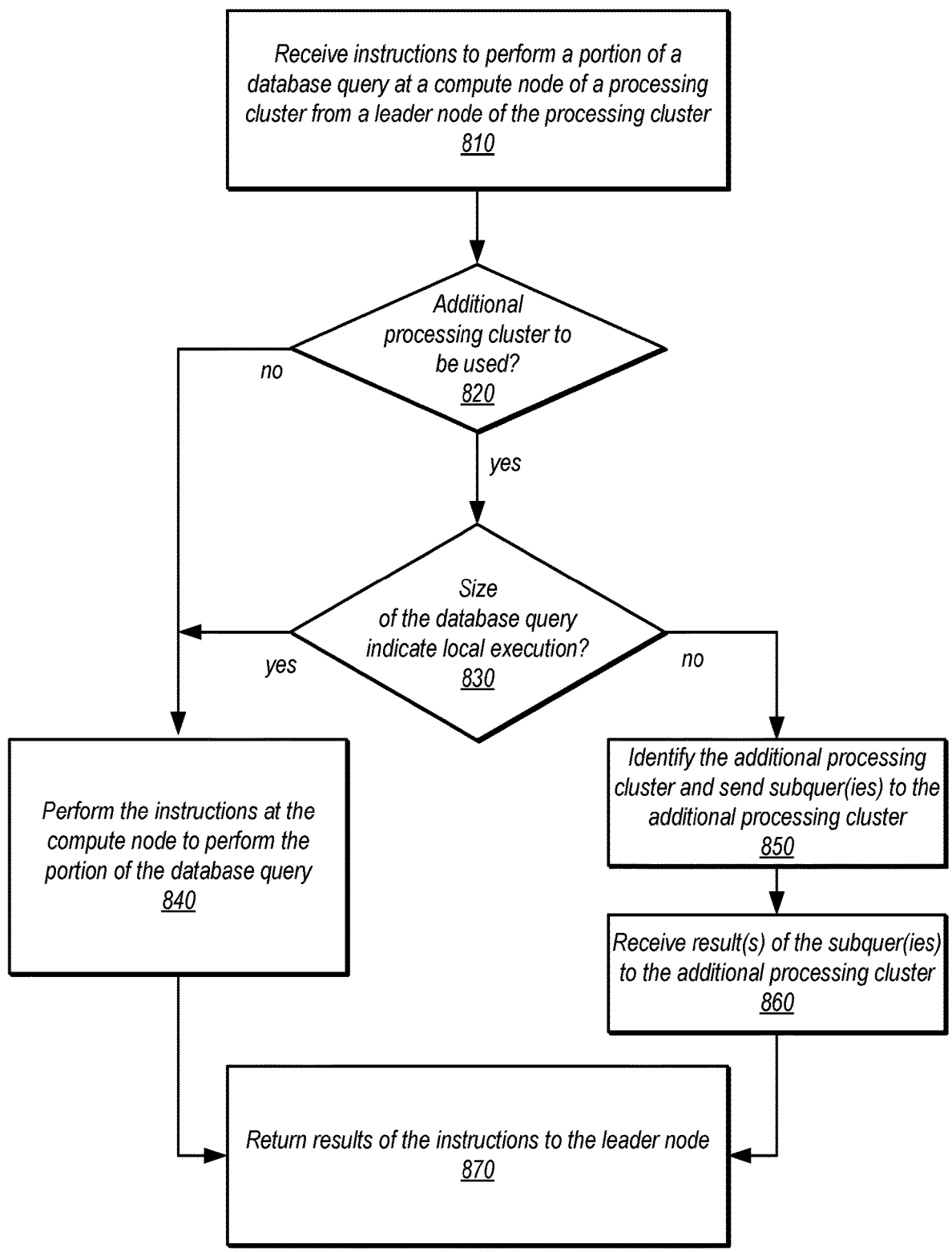
FIG. 8 is a high-level flowchart illustrating methods and techniques to implement executing instructions at a compute node of a processing cluster to perform a portion of a database query using additional processing clusters, according to some embodiments.

In order to scale the capacities of processing cluster 110 to optimally perform a database query, query planning as part of query processing engine 140 may include the use of remote operations to utilize additional processing clusters through compute nodes, such as compute node 112c using additional processing cluster 120, as discussed in detail below with regard to FIGS. 6-8. For example, a leader node or other workload management layer that distributes work amongst compute nodes may implement various query planning techniques, including cost-based query planning techniques, which may determine whether a compute node should utilize an additional processing cluster. Note that each compute node 112 could also use its own additional processing cluster (not illustrated). As part of executing a query, compute node 112c may send additional query plan operations 114 to the additional processing cluster 120, which may implement the same query processing engine 140, and set of compute nodes, such as compute nodes 122a, 122b, 122c, and 122n. These compute nodes 122 may perform respective data access requests, 124a, 124b, 124c, and 124n, in order to access separately stored database data 130 (e.g., in a separate storage system such as storage service 270 discussed below with regard to FIGS. 2-5, in order to return data, as indicated 125a, 125b, 125c, and 125n for processing by the compute nodes (e.g., performing various operations to aggregate, filter, group, or other operations to return operation results 115 on the database data. Additional processing cluster 120 may be co-located on a same host as a compute node 112, as discussed below with regard to FIG. 5, or on a separate host system, as discussed below with regard to FIG. 4.

In some scenarios, query processing may be more performant without using additional processing cluster 120. In those scenarios, compute nodes may still perform data access requests directly to database data 130, as indicated at 116 and 117, in order to complete performance of a database query. Such scenarios may be instructed by a query planning feature implemented as part of query processing engine 140, as discussed above.

Please note that the previous description of a processing clusters is a logical description and thus is not to be construed as limiting as to the implementation of a processing clusters, database data, and performance of queries, or portions thereof.

This specification continues with a general description of a provider network that implements multiple different services, including a database service and storage service, which may implement scaling database query processing using additional processing clusters. Then various examples of the database service and storage service, including different components/modules, or arrangements of components/module that may be employed as part of implementing the services are discussed. A number of different methods and techniques to implement scaling database query processing using additional processing clusters are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
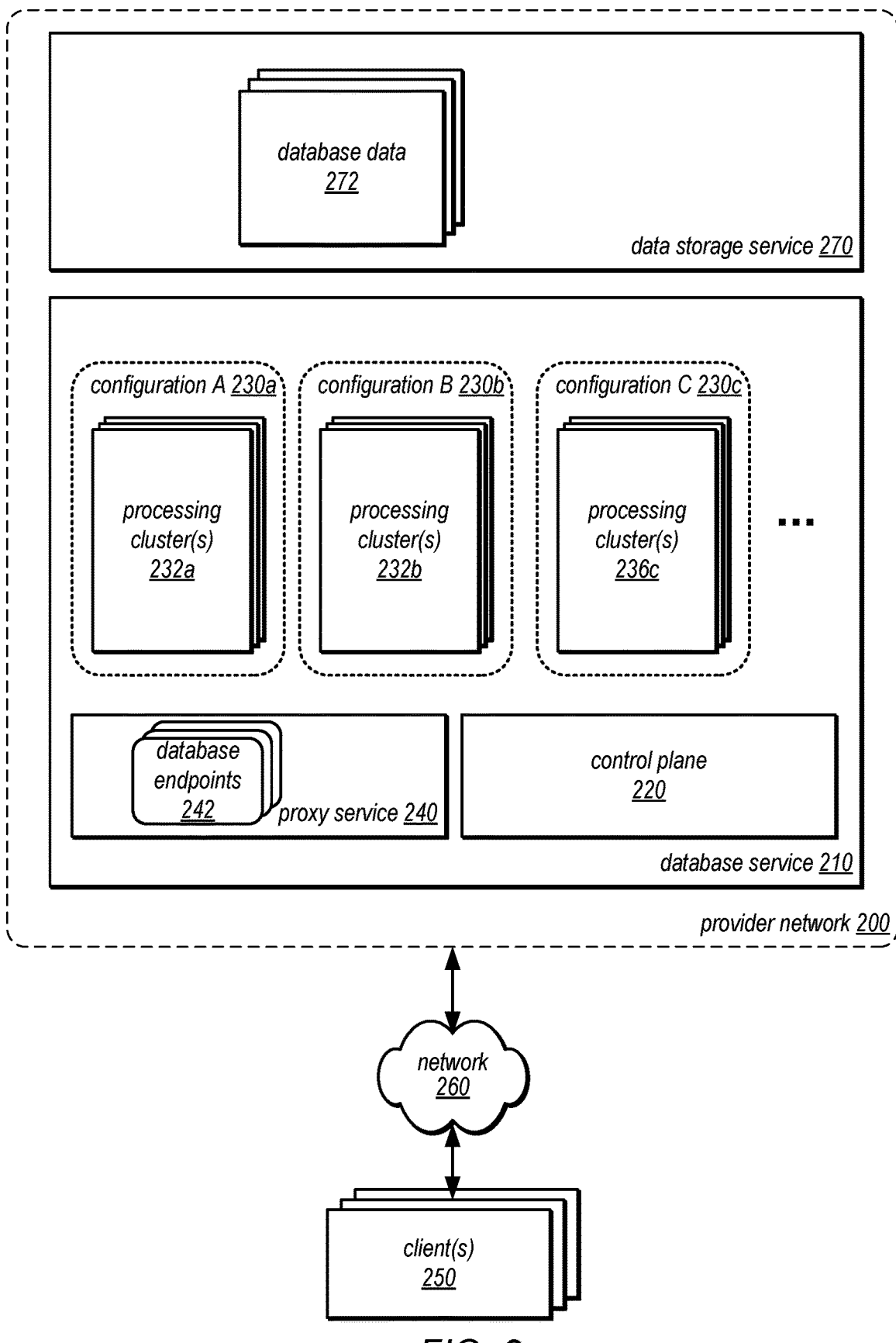
FIG. 2 is a logical block diagram illustrating a provider network offering a database service that scales database query processing using additional processing clusters for databases managed by the database service, according to some embodiments.

FIG. 2 is a logical block diagram illustrating a provider network offering a database service that scales database query processing using additional processing clusters for databases managed by the database service, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be (or included in) various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis, as discussed in detail below with regard to FIGS. 3-7.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 210 may be a data warehouse service. Thus in the description that follows database service 210 may be discussed according to the various features or components that may be implemented as part of a data warehouse service, including control plane 220, proxy service 240, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 9. Different subsets of these computing devices may be controlled by control plane 220. Control plane 220, for example, may provide a cluster control interface to clients or users who wish to interact with the processing clusters, such as processing cluster(s) 232*a*, 232*b*, and 232*c* managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

As discussed above, various clients (or customers, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below with regard to FIGS. 3 and 5. For example, multiple users or clients may access a processing cluster to obtain data warehouse services.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

In at least some embodiments, database service 210 may implement proxy service 240 to provide access to databases (e.g., data warehouses) hosted in database service 210. For databases managed by database service 210, database service 210 may provide database endpoints 242 (e.g., network endpoints) for a hosted database. Database endpoints 242 may not provide direct access to a particular processing cluster 232, as the processing cluster used to respond to such requests (e.g., queries) may change according to the various scaling techniques to select a different processing cluster to perform the query (e.g., in addition to or instead of scaling techniques using additional processing clusters along with the processing cluster handling the query as discussed in detail below with regard to FIGS. 3-5). Instead, client applications may utilize the database endpoint 242 for a database to be included in various client applications or other communications for database access so that proxy service 240 can direct the requests to the appropriate processing cluster without the client application having to be altered every time a change in processing cluster (e.g., scaling operations) are performed by database service 210. In this way, database service 210 can perform scaling and other management operations without interfering with client applications.

Processing clusters, such as processing clusters 232*a*, 232*b*, and 232*c*, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 232 (or routed/redirect/assigned/allocated to processing cluster(s)) may be directed to local data stored in the processing cluster and/or remote data. Therefore, processing clusters may implement local data processing, such as local data processing, (discussed below with regard to FIG. 3) to plan and execute the performance of queries with respect to local data in the processing cluster, as well as a remote data processing client.

Database service 210 may implement different types or configurations of processing clusters. For example, different configurations A 230*a*, B 230*b*, and C 230*c*, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster." Primary clusters 330 may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
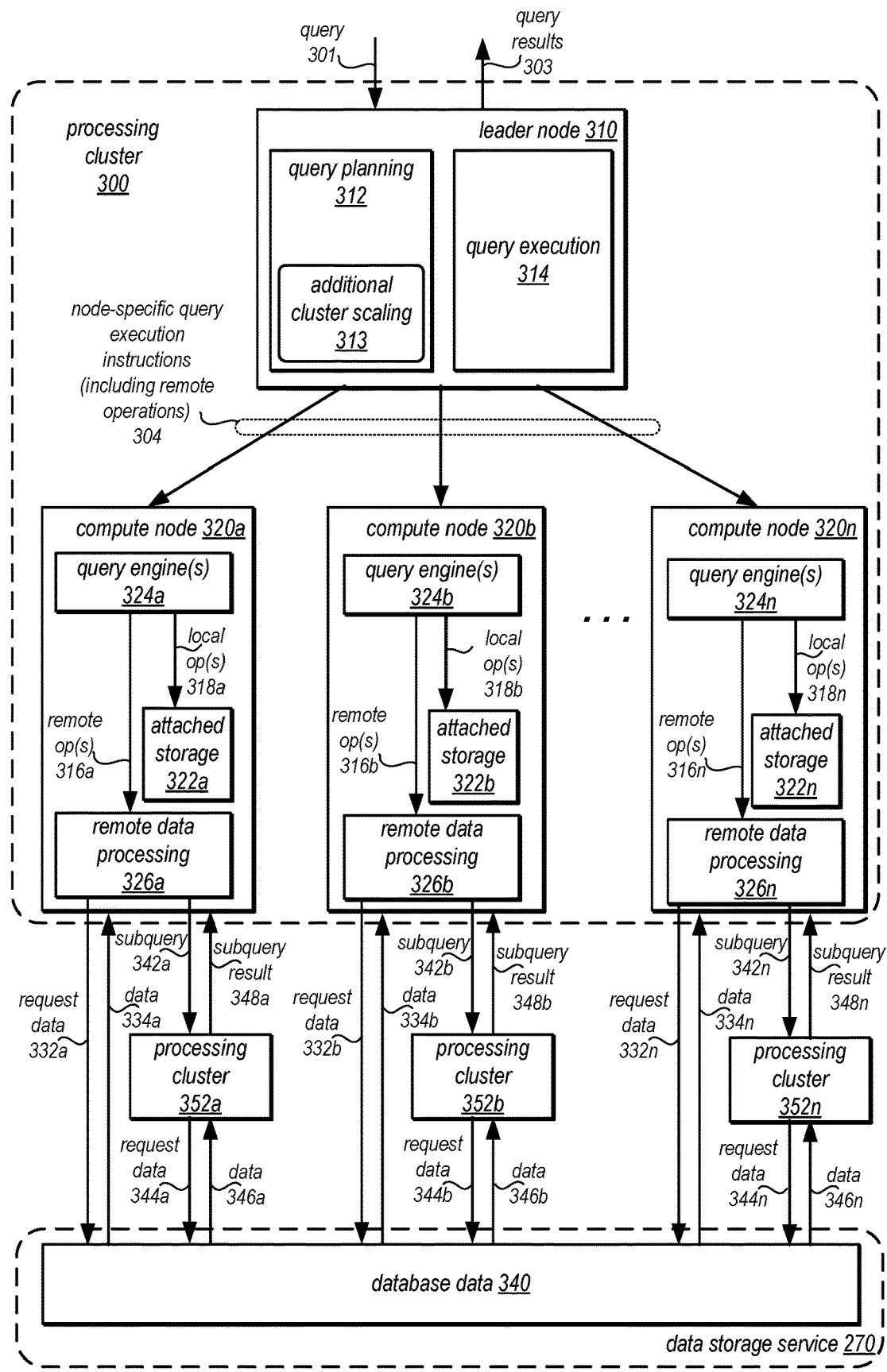
FIG. 3 is a logical block diagram illustrating an example processing cluster of a database service, according to some embodiments.

FIG. 3 is a logical block diagram illustrating an example processing cluster of a database service, according to some embodiments. Processing cluster 300 may be query processing cluster, like processing clusters 232 discussed above with regard to FIG. 2, that distributes execution of a query among multiple computational (which may also be referred to as "compute") nodes. As illustrated in this example, a processing cluster 300 may include a leader node 310 and compute nodes 320a, 320b, and 320n, which may communicate with each other over an interconnect (not illustrated). Leader node 310 may implement query planning 312 to generate query plan(s), such as generating query plans that utilize additional processing cluster scaling 313 as discussed in detail below with regard to FIGS. 4-8, query execution 314 for executing queries on processing cluster 300 that perform data processing that can utilize remote query processing resources for remotely stored data (e.g., by utilizing one or more query execution slot(s)/queue(s)). As described herein, each node in a primary processing cluster 300 may include attached storage, such as attached storage 322a, 322b, and 322n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 300 is a leader node as illustrated in FIG. 3, but rather different nodes of the nodes in processing cluster 300 may act as a leader node or otherwise direct processing of queries to data stored in processing cluster 300. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2. As discussed above with regard to FIG. 3, leader node 310 may communicate with proxy service 240 and may receive query 301 and return query results 303 to proxy service 240 (instead of communicating directly with a client application). Alternatively, in those embodiments where leader node 310 implements query routing as a primary cluster, then leader node 310 may act as the proxy for other, secondary clusters, attached to the database which are forwarded and perform the query, and may return query results directly to a client application.

Leader node 310 may be a node that receives a query 301 from various client programs (e.g., applications) and/or subscribers (users) (either directly or routed to leader node 310 from proxy service 240), then parses them and develops an execution plan (e.g., query plan(s)) to carry out the associated database operation(s)). More specifically, leader node 310 may develop the series of steps necessary to obtain results for the query. Query 301 may be directed to data that is stored both locally within processing cluster 300 (e.g., at one or more of compute nodes 320) and data stored remotely. Leader node 310 may also manage the communications among compute nodes 320 instructed to carry out database operations for data stored in the processing cluster 300. For example, node-specific query instructions 304 may be generated or compiled code by query execution 314 that is distributed by leader node 310 to various ones of the compute nodes 320 to carry out the steps needed to perform query 301, including executing the code to generate intermediate results of query 301 at individual compute nodes may be sent back to the leader node 310. Leader node 310 may receive data and query responses or results from compute nodes 320 in order to determine a final result 303 for query 301.

A database schema, data format and/or other metadata information for the data stored among the compute nodes, such as the data tables stored in the cluster, may be managed and stored by leader node 310. Query planning 312 may account for remotely stored data by generating node-specific query instructions that include remote operations to be directed by individual compute node(s). Although not illustrated, in some embodiments, a leader node may implement burst manager to send a query plan generated by query planning 312 to be performed at another attached processing cluster and return results received from the burst processing cluster to a client as part of results 303.

In at least some embodiments, a result cache may be implemented as part of leader node 310. For example, as query results are generated, the results may also be stored in result cache (or pointers to storage locations that store the results either in primary processing cluster 300 or in external storage locations), in some embodiments. Result cache may be used instead of other processing cluster capacity, in some embodiments, by recognizing queries which would otherwise be sent to another attached processing cluster to be performed that have results stored in result cache. Various caching strategies (e.g., LRU, FIFO, etc.) for result cache may be implemented, in some embodiments. Although not illustrated in FIG. 3, result cache could be stored in other storage systems (e.g., other storage services, such as a NoSQL database) and/or could store sub-query results.

Processing cluster 300 may also include compute nodes, such as compute nodes 320a, 320b, and 320n. Compute nodes 320, may for example, be implemented on servers or other computing devices, such as those described below with regard to computer system 1000 in FIG. 9, and each may include individual query processing "slices" defined, for example, for each core of a server's multi-core processor, one or more query processing engine(s), such as query engine(s) 324a, 324b, and 324n, to execute the instructions 304 or otherwise perform the portions of the query plan assigned to the compute node. Query engine(s) 324 may access a certain memory and disk space in order to process a portion of the workload for a query (or other database operation) that is sent to one or more of the compute nodes 320. Query engine 324 may access attached storage, such as 322a, 322b, and 322n, to perform local operation(s), such as local operations 318a, 318b, and 318n. For example, query engine 324 may scan data in attached storage 322, access indexes, perform joins, semi joins, aggregations, or any other processing operation assigned to the compute node 320.

Query engine 324a may also direct the execution of remote data processing operations, by providing remote operation(s), such as remote operations 316a, 316b, and 316n, to remote data processing clients, such as remote data processing management 326a, 326b, and 326n. Remote data processing management 326 may be implemented by a client library, plugin, driver or other component that sends request sub-queries to be performed by data storage service 270 or requests to for data, 332a, 332b, and 332n. As noted above, in some embodiments, Remote data processing management 326 may read, process, or otherwise obtain data 334a, 334b, and 334c, in response from database data 340 in data storage service 270, which may further process, combine, and or include them with results of local operations.

As illustrated in FIG. 3, and discussed above with regard to FIG. 1 and below with regard FIGS. 4-8, in some embodiments, remote data processing may utilize additional processing clusters, such as additional processing clusters 352a, 352b, and 352n to perform respective subqueries, such as subqueries 342a, 342b, and 342n, according to instructions generated in accordance with query plans that include remote operations to use additional processing clusters. These subqueries 342 may be formatted according to a query language or other interface which may be the same as used to receive query 301, in some embodiments, as processing clusters 352 may implement the same query processing engines as the primary cluster (e.g., processing cluster 300). Processing clusters 352 may request data, as indicated at 344a, 344b, and 344n, in order to obtain data from database data 340 in data storage service 270, as indicated at 346a, 346b, and 346n. Processing clusters 342 may then perform the subqueries using the received data and return respective results, as indicated at 348a, 348b, and 348n.

Compute nodes 320 may send intermediate results from queries back to leader node 310 for final result generation (e.g., combining, aggregating, modifying, joining, etc.). Remote data processing clients 326 may retry data requests 332 that do not return within a retry threshold.

Attached storage 322 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
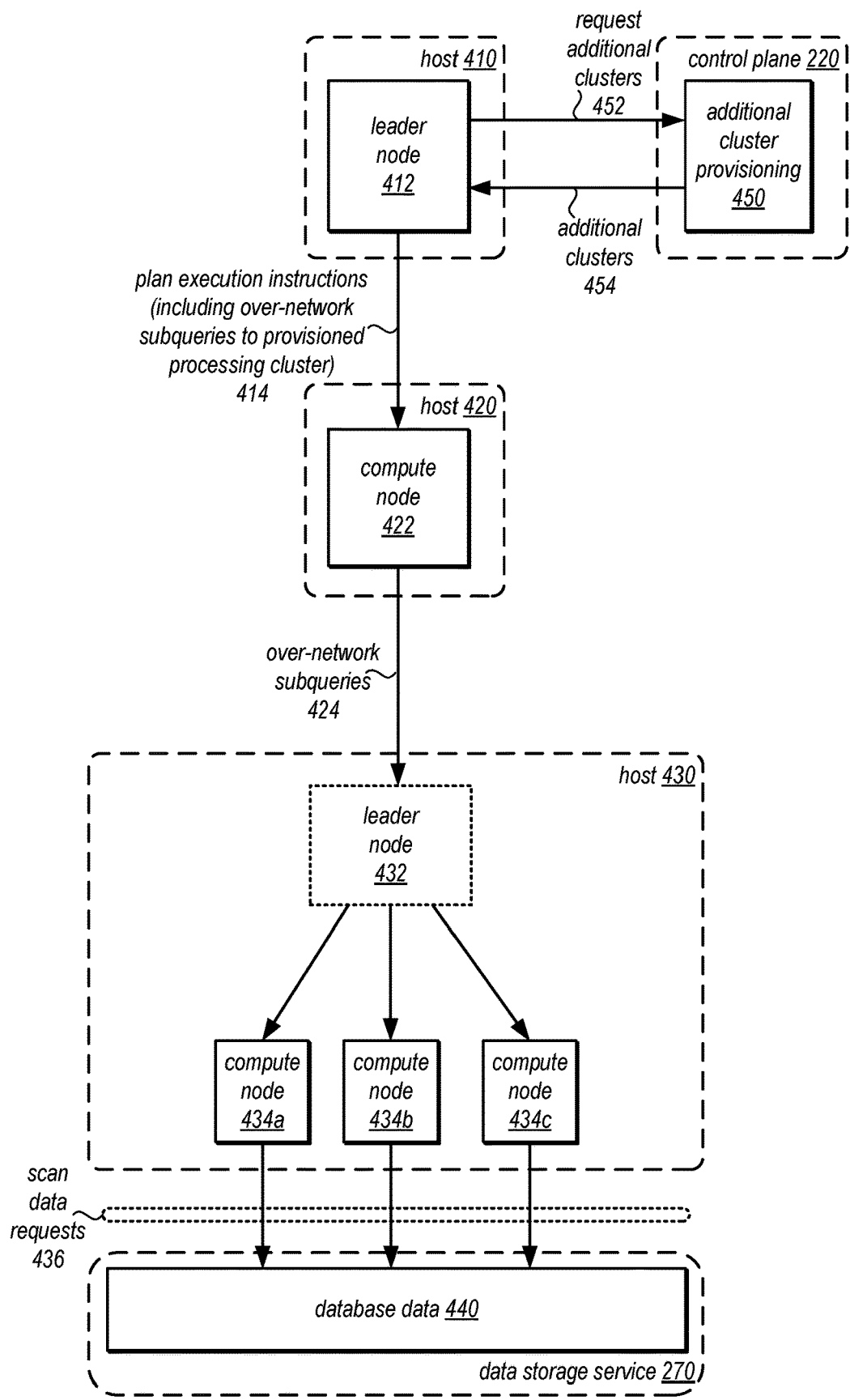
FIG. 4 is a logical block diagram illustrating a separately hosted additional processing cluster, according to some embodiments.

Additional processing clusters may be implemented in different ways for use of processing clusters that originally receive and begin work on queries. In some embodiments, a separate group, pool, or fleet of additional processing clusters may be made ready to perform subqueries on behalf of processing clusters in those scenarios where query planning includes those operations to use additional processing clusters. FIG. 4 is a logical block diagram illustrating a separately hosted additional processing cluster, according to some embodiments.

For example, leader node 412 may be implemented on a host system 410 (e.g., a sever or other computing system 1000 in FIG. 9 below). Compute nodes of the processing cluster, such as compute node 422 may be implemented on different host systems, such as host 420. When leader node 412 determines to use additional processing clusters as part of planning to execute a query, leader node 412 may request additional clusters 452 from additional cluster provisioning 450 in control plane 220. For example, additional cluster provisioning 450 may maintain a fleet or pool processing clusters (e.g., using one or more resource processing configurations as discussed above with regard to FIG. 2) that are used as additional processing resources for queries already routed to a primary processing cluster. These additional processing clusters may be different from processing clusters that are attached to a database managed by the database service 210 and which perform a query routed to the attached processing cluster (to burst or scale to multiple processing clusters handling different queries to the same database, as discussed above with regard to proxy service 240). Additional cluster provisioning 450 may update various cluster mappings or other tracking/state information for available processing clusters to assign respective additional clusters 454 to the compute nodes in a response to leader node 412.

As indicated at 414, leader node 412 may then send plan execution instructions, including over-network subqueries to provisioned processing clusters to compute node 422. As part of the instructions 414, various access credentials, metadata, and other information used to perform over-network subqueries 424 may be included, including the identity of the additional processing cluster (e.g., as a network address, endpoint or other identifier). Compute node 422 may then send over-network subqueries to the additional processing cluster.

In at least some embodiments, the additional processing cluster may be implemented similar to (or the same as) the primary processing cluster, with a leader node 432 that performs operations similar to leader node 310 discussed above with regard to FIG. 3, and compute nodes 434a, 434b, and 434c, similar to compute nodes 320 discussed above with regard to FIG. 3. Leader node 432 may, for example, receive subqueries 424, develop a query plan, generate execution instructions and send them to compute nodes 434 which may perform various operations, such as scan data requests 436 to access database data 440 in data storage service 270. In at least some embodiments, a single host system, such as host 430, may implement the entire processing cluster (unlike the primary processing cluster that uses separate hosts for leader and compute nodes as illustrated in FIG. 4). For example, leader node 432 and compute nodes 434 may be implemented as separate processes, containers (e.g., using operating system virtualization), or virtual machines on host 430. In some embodiments, multiple host systems could be used (not illustrated). In some embodiments, a same version of the query engine may be implemented without leader node 432 for the additional processing cluster at host 430. Instead, instructions may be sent directly to different compute nodes 434 from compute node 422.

Figure 5:
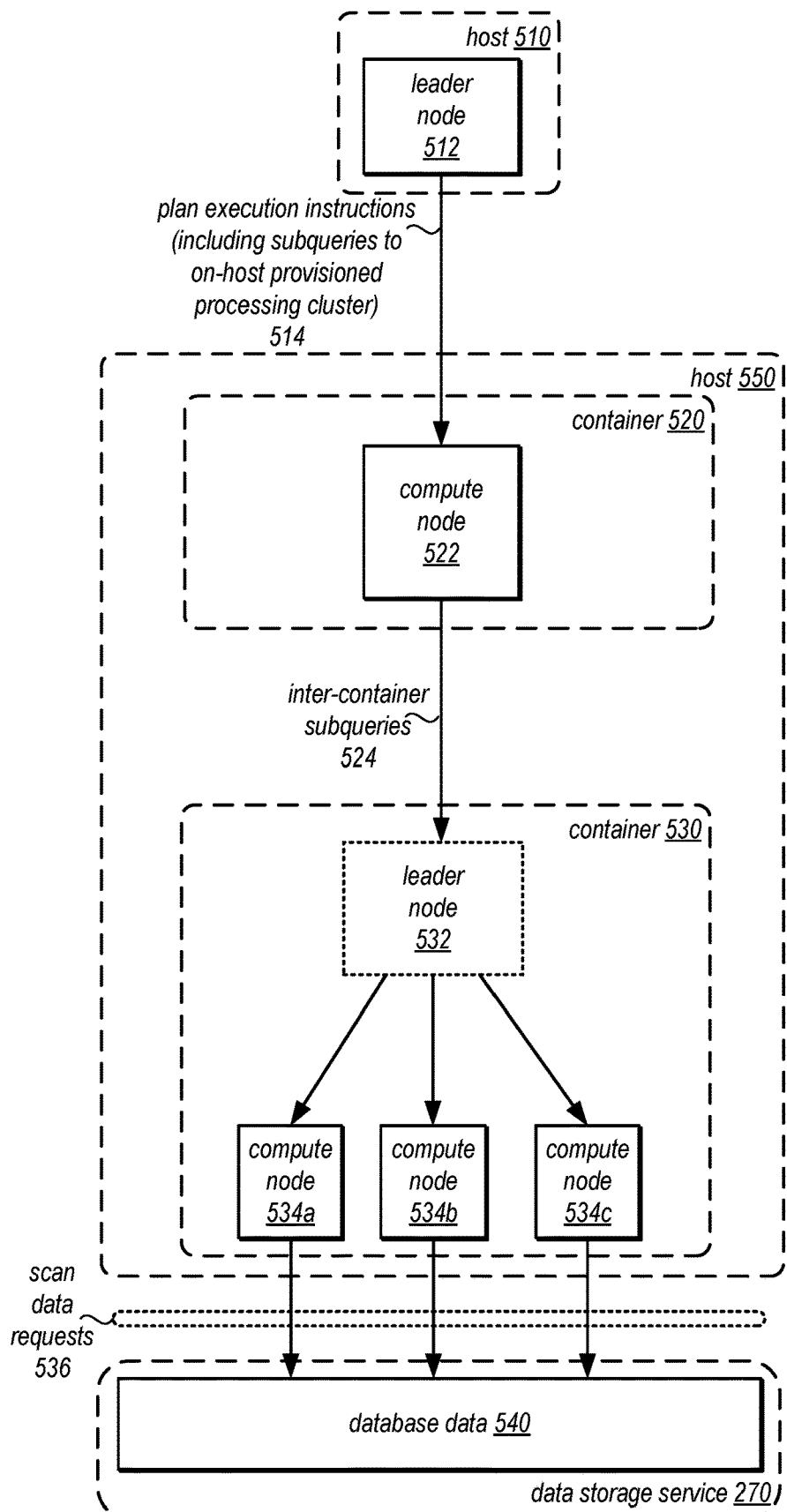
FIG. 5 is a logical block diagram illustrating a collocated additional processing cluster on a same host as a compute node, according to some embodiments.

In some embodiments, co-location of additional processing clusters with compute nodes may be implemented on a same host. This offers further performance improvements for query processing, such as eliminating network communications between compute nodes and additional processing clusters, as well as taking advantage of dynamic resource allocation techniques offered by virtualization technologies like container virtualization, which may allow for different containers executing on a same host system to dynamically obtain the computing resources needed to perform operations (instead of only being able to operate within a statically define amount of computing resources, which may make it difficult to predict how much resources an additional processing cluster may need as opposed to a compute node). FIG. 5 is a logical block diagram illustrating a collocated additional processing cluster on a same host as a compute node, according to some embodiments.

For example, leader node 512 may be implemented on a host system 510 (e.g., a sever or other computing system 1000 in FIG. 9 below). Compute nodes of the processing cluster, such as compute node 522 may be implemented on different host systems, such as host 550. When leader node 512 determines to use additional processing clusters as part of executing a query, leader node may send plan execution instructions including subqueries to use an on-host provisioned processing cluster by the compute node.

Host 550 may, in some embodiments, implement container virtualization (e.g., operating system virtualization that allows different containers, such as container 520 and container 530 to implement different applications without having to implement separate guest operating systems for each container). One container, 520, may implement compute node 522 (other host systems with other containers may implement other compute nodes of the processing cluster that includes leader node 512). Another container, container 530, may implement the additional processing cluster, which may receive and perform inter-container subqueries (e.g., avoiding network communications entirely). In other embodiments, various other virtualization techniques may be utilized to implement an additional processing cluster on a same host as the compute node (e.g., micro virtual machines). For example, container 530 may include a leader node 532 that performs operations similar to leader node 310 discussed above with regard to FIG. 3, and compute nodes 534a, 534b, and 534c, similar to compute nodes 320 discussed above with regard to FIG. 3. Leader node 532 may, for example, receive subqueries 524, develop a query plan, generate execution instructions and send them to compute nodes 534 which may perform various operations, such as scan data requests 536 to access database data 540 in data storage service 270. In some embodiments, a same version of the query engine may be implemented without leader node 532 for the additional processing cluster at container 530. Instead, instructions may be sent directly to different compute nodes 534 from compute node 522.

Although FIGS. 2-5 have been described and illustrated in the context of a provider network implementing a database service, like a data warehousing service, the various components illustrated and described in FIGS. 2-5 may be easily applied to other database systems that can utilize scaling database query processing using additional processing clusters. As such, FIGS. 2-5 are not intended to be limiting as to other embodiments of scaling database query processing using additional processing clusters.

Figure 6:
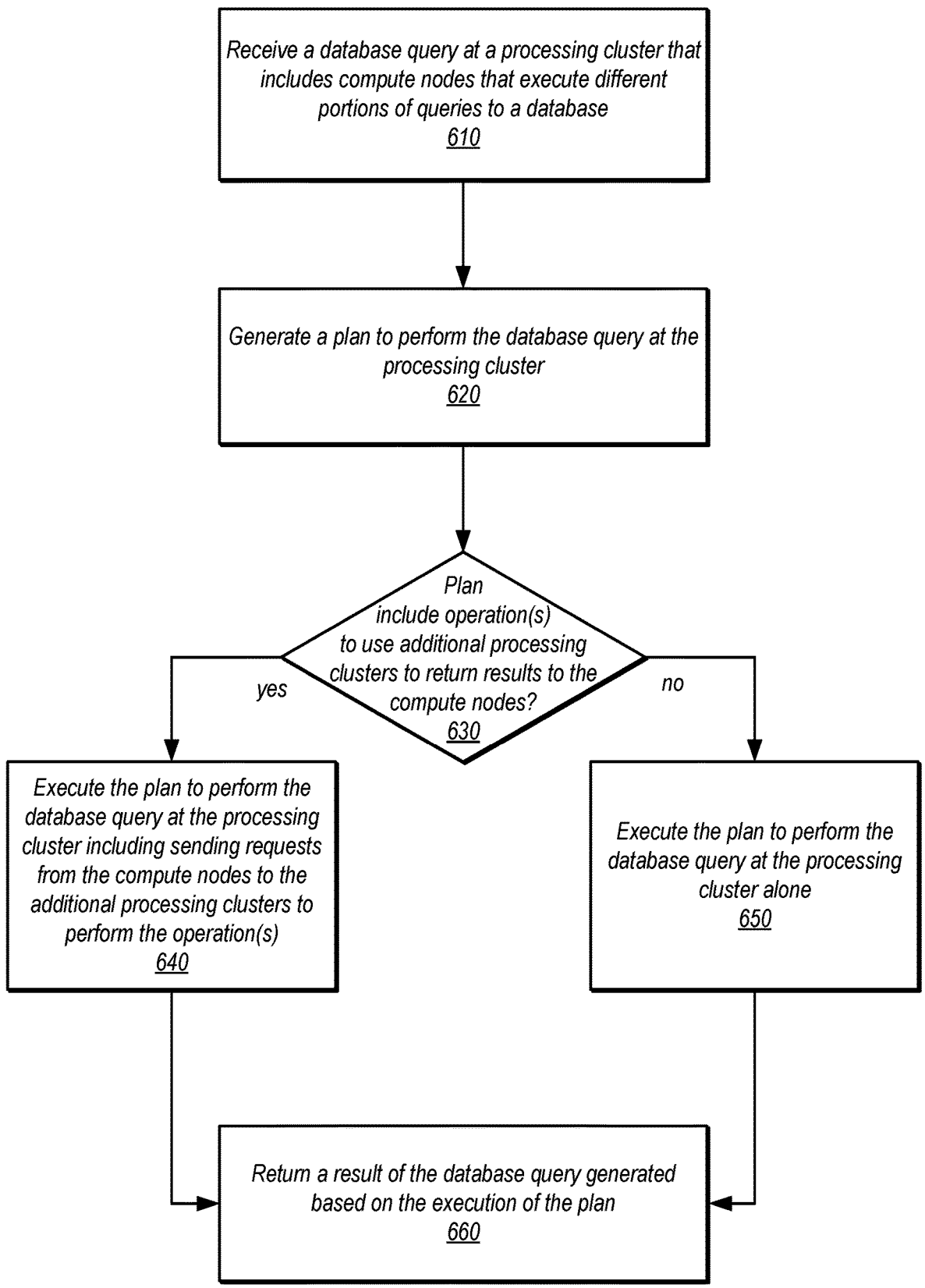
FIG. 6 is a high-level flowchart illustrating methods and techniques to implement scaling database query processing using additional processing clusters, according to some embodiments.

FIG. 6 is a high-level flowchart illustrating methods and techniques to implement scaling database query processing using additional processing clusters, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network and a data set stored in a service of a second provider network). Different types of query engines or other database systems may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 610, a database query may be received at a processing cluster that includes compute nodes that execute different portions of queries to a database, in various embodiments. In some embodiments, the database query may be received at a network endpoint of the processing cluster (e.g., of a leader node of the processing cluster). In some embodiments, the database query may be received via a network endpoint associated with a database managed by a database service so that the database service may route the database query to the processing cluster. The processing cluster may include multiple different compute nodes to provide distributed query processing, taking advantage of parallel processing capabilities of multiple compute nodes. In some embodiments, the processing cluster may operate without a dedicated leader node, but may share leader node responsibilities (e.g., rotate or distribute different portions of leader node responsibilities). In some embodiments, as illustrated above in FIGS. 3-5, the processing cluster may include a dedicated leader node.

The database query may be received according to various interfaces, formats, and/or protocols. For example, the database query may be formatted according to a query language such as Structured Query Language (SQL), in some embodiments, or may be specified according to an Application Programming Interface (API) for receiving queries. In at least some embodiments, the database query may be one database query of many database queries that can be submitted by one or many different users to a same database. For example, the database query may compete for computing resources along with other queries received from other users to be executed with respect to a database in some embodiments.

For a managed database, a network endpoint may be a network address or other location for which a database service may implement networking resources to listen and obtain the query. By sending the database query to the network endpoint, the target of the database query, the database, may be identified. In some embodiments, the network endpoint may be provided (e.g., to a user for inclusion in client applications) when the database is created. In at least some embodiments, the database may be created, configured, or modified to be managed by the database service, such that automatic management techniques, including providing a "serverless" management experience for a user of the database is performed. For example, the database may be created without any specified number or other configuration of computing resources used to process queries (or provide other access to) the database. Instead, an initial query processing cluster may be automatically selected by the database service for the database, according to various techniques (e.g., using a pre-defined initial query processing cluster size or using prediction techniques to determine the initial query processing cluster size based on other information, such as an amount or type of data stored in the database).

As indicated at 620, a plan may be generated to perform the database query at the processing cluster, in some embodiments. FIG. 7, discussed below, provides various examples of techniques that may be use to generate a plan. Some techniques may include obtaining various metadata or other information describing the database targeted by the database query (e.g., table statistics, table definitions, and partitions of the table) as part of generating the query plan (e.g., in order to perform cost optimization and other planning techniques).

As part of generating the query plan, a determination may be made as to whether to scale out processing of the database query using additional processing clusters. For example, although both the processing cluster and the potential additional processing clusters can access the same data types and formats and perform the same operations as they may use the same query engine), greater parallelization may have performance benefits for some database queries, and not for other database queries. Query planning may consider the features of the database query in order to determine whether scaling to additional processing clusters will improve database query performance. Consider, for example, when a subquery to be executed by an additional query processing cluster does not reduce data read from storage (e.g., through aggregation, filter, or other operation), then there may be no benefit to utilizing an additional processing cluster to further parallelize performance of the database query. For instance, a database query that is a "COPY" or "SELECT*" which do not filter out data may not obtain any performance benefits from scaling to an additional processing cluster. Thus, in various embodiments, the determination as to whether to include operations to use an additional processing cluster can be made based on a selected number of columns and the expected selectivity of those columns, for example.

As indicated at 630, performance of the database query may different according to whether the generated plan includes operations to use additional processing clusters to return results to the compute nodes of the processing cluster. In scenarios wherein the plan does include operations to utilize additional processing clusters, then as indicated at 640, the plan may be expected to perform the database query including having the compute nodes send requests to respective additional processing clusters to perform the operations, and then returning a result of the database query, as indicated at 660, based on the performance of the additional processing clusters. As discussed above with regard to FIGS. 4 and 5, how the requests are sent may differ according to whether the additional processing clusters is implemented on the same or a separate host as the compute node instructing the additional processing cluster. In some embodiments, the additional processing clusters may operate with or without a dedicated leader node (sharing leader node responsibilities).

For those plans that do not include operation(s) to use the additional processing clusters to return results to the compute nodes, the plan to perform the database query may be performed using the processing cluster alone, as indicated at 650. For example, local attached storage may be accessed, remote requests to access data in separate storage system or service may be performed, or some combination of both actions may be performed by the processing cluster. As indicated at 660, a result of the database query based on the performance of the database query plan may then be returned.

As discussed above, some processing clusters may utilize a leader node for multiple compute nodes architecture for processing database queries. FIG. 7 is a high-level flowchart illustrating methods and techniques to implement generating a plan a leader node of processing cluster to perform a database query using additional processing clusters, according to some embodiments. As indicated at 710, a database query received at a leader node of a processing cluster may be parsed to generate a query tree for the database query, in some embodiments. For example, the database query may be specified in a query language, such as SQL, and various parsing techniques to separate the various features of the database query into different nodes corresponding to keywords, identifiers, constants, operators, or tokens, and syntactic categories, such as the expressions or conditions features of the database query.

As indicated at 720, an initial plan to perform the database query may be generated from the query tree, in some embodiments. For example, various query planning rules or techniques that identify operations that correspond to the different nodes in the query tree (e.g., scan operations to obtain portions of data, filter operations to satisfy conditions, etc.) may be implemented. As indicated at 730, in various embodiments, the initial plan may be evaluated to determine whether to use additional processing clusters, in some embodiments. For example, as discussed above with regard to FIG. 6, a determination of whether scaling to additional processing clusters will improve database query performance may be made using the operations included in the initial query plan. If, for instance, scan operations are included in the initial plan with no filter or aggregation features, then additional processing clusters may not be determined. Similarly, an evaluation to determine a number of columns of a table selected to perform the database query and the expected selectivity of those columns, for example, could be ascertained from the initial plan operations (and metadata describing the table, such as table statistics).

As indicated at 740, if a determination is made to use additional processing clusters, then remote operations may be included in a rewrite of the initial plan (as indicated at 750) that use the additional processing clusters to perform plan operations (e.g., scan operations, aggregation operations (e.g., COUNT, SUM, AVG, MIN, MAX, etc.), group by operations, filter operations (e.g., including comparison conditions and pattern-matching conditions, such as "LIKE"), and string functions. If the determination is to use additional processing clusters, then any operation that can be performed remotely by the additional processing clusters may be included or otherwise assigned for additional processing cluster performance, in some embodiments.

As indicated at 750, the initial plan to generate an optimized plan to perform the database query may be rewritten, in some embodiments. For instance, in addition to rewrites to include remote operations (in the event additional processing clusters are used), then other optimizations such as join operation reordering (e.g., to reduce the number of results to use for performing a join) and/or various other optimizations for performing the database query may be implemented by rewriting the initial plan (e.g., modifying the operators and structure, ordering, or other features of the plan to modify performance of the database query).

As indicated at 760, if a determination is made to use additional processing clusters in the optimized plan, then further information may be included in or along with instructions generated to send to compute nodes of the processing cluster to perform the optimized query plan, as indicated at 770. For example, templates for subqueries to send to the additional processing clusters (e.g., in SQL or other supported query format) and additional metadata describing the table(s) to be accessed), may be created and included with generated instructions, as indicated at 762. Instructions generated at 770 may be executable instructions generated as a result of compiling the optimized query plan to produce executable artifacts specific to each compute node in the processing cluster, in some embodiments.

In some embodiments, compute nodes may be able to make dynamic determinations as to whether utilizing an additional processing cluster will provide an optimal performance for a database query. FIG. 8 is a high-level flowchart illustrating methods and techniques to implement executing instructions at a compute node of a processing cluster to perform a portion of a database query using additional processing clusters, according to some embodiments. As indicated at 810, instructions to perform a portion of a database query may be received at a compute node of a processing cluster from a leader node of the processing cluster, in some embodiments. For example, these instructions may be pre-compiled, executable artifacts.

In some embodiments, these instructions may indicate whether an additional processing cluster is to be used, as indicated at 820. If not, as indicated at 840, the instructions may be performed by the compute node to perform the portion of the database query, as indicated at 840, and results of the instructions returned to the leader node as indicated at 870. For instance, the compute node may access local storage and/or remote storage directly in order to perform operations included in the instructions and return the results. In some circumstances, results may be shuffled to other compute nodes in the processing cluster, which may use the results to perform an operation (e.g., to check to see if results match a join criteria being evaluated at another compute node).

If an additional processing cluster has been indicated as being used, then as indicated at 830, another evaluation about whether to use the additional processing cluster can be performed by the compute node, in some embodiments. For example, a compute node may be able to determine some information about the database query (which may not be known until runtime at the compute node). A size of the database query, for instance, may be determined according to the number of scan ranges or segments after pruning or otherwise eliminating partitions that do not satisfy the database query (e.g., are partitions for periods of time outside of the database query requested time range). If the size is less than some threshold (e.g., 2 or less scan ranges), then size may indicate local execution (instead of using an additional processing cluster). Note this decision can be done independently at each compute node thus in some scenarios it may be possible that one compute node uses an additional processing cluster and another compute node in the same original/primary processing cluster does not use an additional processing cluster but performs the portion of the database query directly. In this way, additional processing cluster scaling can be closely fit to the performance benefits of individual compute nodes (as opposed to the cluster as a whole).

If the size indicates non-local execution (using the additional processing cluster), then as indicated at 850, the additional processing cluster may be identified and subquer(ies) sent to the additional processing cluster, in some embodiments. For example, different implementations of the additional processing cluster may be identified separately. For example, as discussed above with regard to FIG. 4, if the additional processing cluster is separately hosted, then a control plane component for a service (e.g., a data warehouse service) may be used to provision the additional processing clusters for compute nodes. For additional processing clusters on the same host using a different container, a cross-container process to contact another container may be used (e.g., an API or other feature may be invoked and used to send the subquery(ies)). As indicated at 860, results of the subquery(ies) may be received from the additional processing cluster and then used to return results of the instructions to the leader node, as indicated at 870.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of scaling database query processing using additional processing clusters as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 9:
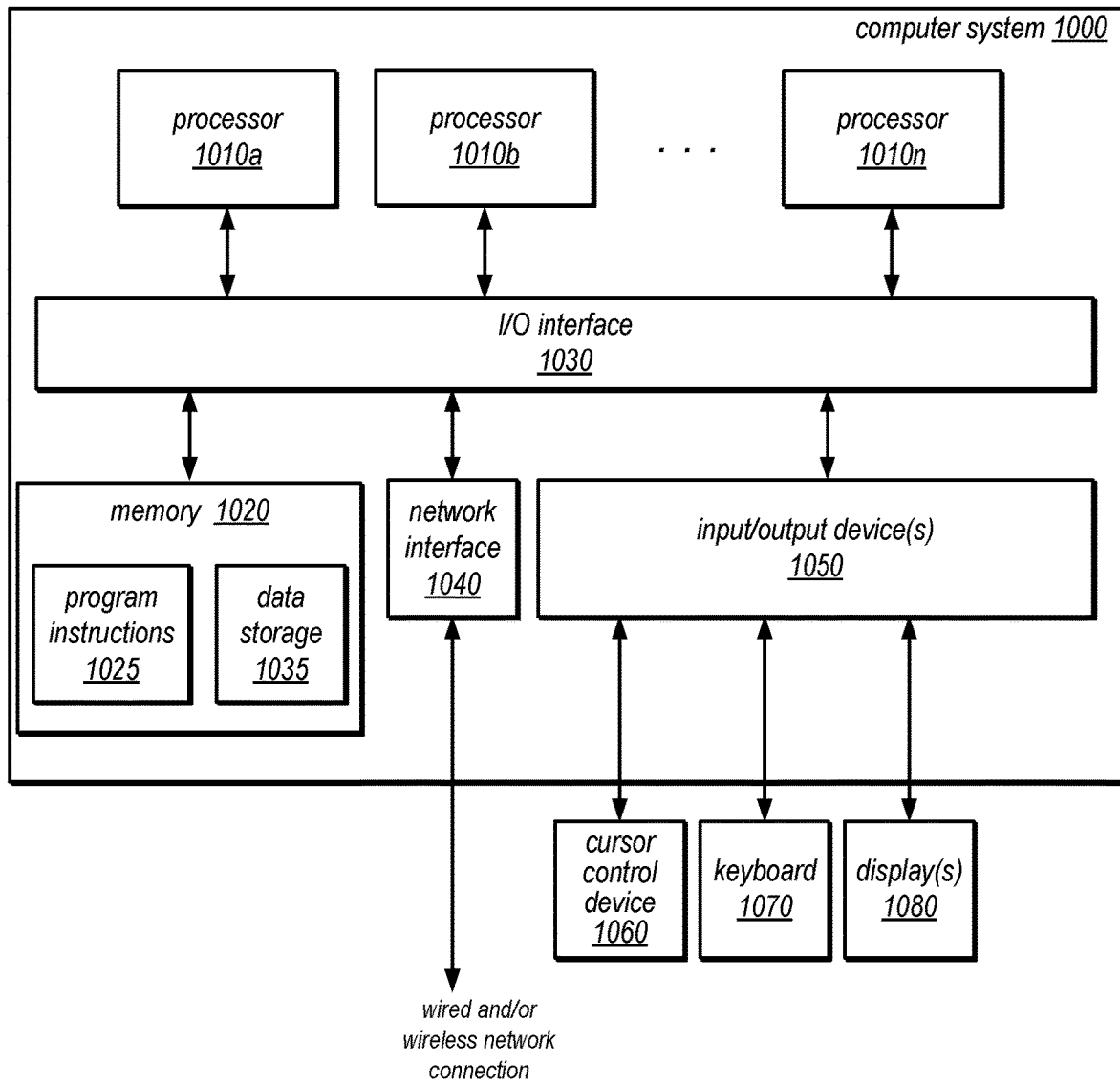
FIG. 9 illustrates an example system that implements the various methods, techniques, and systems described herein, according to some embodiments.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of computing devices implementing different respective hosts of a database service offered by a provider network, wherein the database service comprises a primary processing cluster to perform database queries to a database hosted by the database service, wherein the primary processing cluster comprises a leader node and a plurality of compute nodes hosted at different ones of the respective hosts;
wherein the leader node is configured to:
receive a database query directed to the database;
determine to use respective additional processing clusters of the database service for individual ones of the compute nodes;
generate a plan to perform the database query at the primary processing cluster, wherein the plan includes one or more operations to instruct individual ones of the compute nodes to use the respective additional processing clusters of the database service to perform the one or more operations and return results of the one or more operations to the individual ones of the compute nodes, wherein the respective additional processing clusters respectively implement a same query processing engine, as is implemented by the primary processing cluster, at an additional leader node and a plurality of additional compute nodes that receive instructions from the additional leader node engine to perform the one or more operations;
respectively instruct the compute nodes to execute the plan to perform the database query, wherein the respective instructions cause individual ones of the compute nodes to send requests to the respective additional processing clusters to perform the one or more operations of the plan; and
return a result of the database query generated based on the performance of the one or more operations of the plan at the respective additional processing clusters.

2. The system of claim 1, wherein the leader node is further configured to:
receive a second database query directed to the database;
determine not to use the respective additional processing clusters for individual ones of the compute nodes;
generate a plan to perform the second database query at the primary processing cluster alone;
respectively instruct the compute nodes to execute the plan to perform the second database query; and
return a result of the second database query generated based on the performance of the plan to perform the second database query.

3. The system of claim 1, wherein the respective additional processing clusters are hosted on a same one of the hosts that hosts the compute nodes that instructed the additional processing clusters.

4. The system of claim 1, wherein the requests sent to the respective additional processing clusters to perform the one or more operations of the plan are sent over a network to other ones of the hosts that host the additional processing clusters.

5. A method, comprising:
receiving a database query at a processing cluster of a database service comprising a plurality of compute nodes that execute different portions of queries to a database;
generating, by the processing cluster, a plan to perform the database query at the processing cluster, wherein the plan includes one or more operations to instruct individual ones of the compute nodes to use respective additional processing clusters of the database service to perform the one or more operations and return results of the one or more operations to the individual ones of the compute nodes, wherein the additional processing clusters respectively implement a same query processing engine, as is implemented by the processing cluster, at an additional leader node and a plurality of additional compute nodes that receive instructions from the additional leader node engine to perform the one or more operations;

executing, by the processing cluster, the plan to perform the database query, comprising sending requests, by the individual ones of the compute nodes, to the respective additional processing clusters to perform the one or more operations of the plan; and returning, by the processing cluster, a result of the database query generated based on the execution of the plan to perform the database query.

6. The method of claim 5, further comprising:
receiving a second database query at the processing cluster;
generating, by the processing cluster, a plan to perform the second database query at the processing cluster alone;
executing, by the processing cluster, the plan to perform the second database query; and
returning, by the processing cluster, a result of the second database query generated based on the execution of the plan to perform the second database query.

7. The method of claim 6, wherein executing the plan to perform the second database query comprises accessing one or more locally attached storage devices at the compute nodes of the processing cluster.

8. The method of claim 6, wherein executing the plan to perform the second database query comprises sending one or more requests to access one or more data objects storing data for the database in separate storage service.

9. The method of claim 5, wherein the compute nodes are implement on different respective hosts, and wherein individual ones of the respective additional processing clusters are hosted on a same one of the hosts that hosts the compute node that instructed the additional processing cluster.

10. The method of claim 5, wherein the requests sent to the respective additional processing clusters to perform the one or more operations of the plan are sent over a network from respective hosts for the individual ones of the compute nodes to different hosts that of the additional processing clusters.

11. The method of claim 5, wherein generating the plan to perform the database query at the processing cluster comprises:
generating, by a leader node of the processing cluster, an initial plan to perform the database query from a query tree generated as a result of parsing the database query;
evaluating, by the leader node of the processing cluster, the initial plan to determine that the respective additional processing clusters are to be used; and
including, by the leader node of the processing cluster, the one or more operations to instruct the individual ones of the compute nodes to use the respective additional processing clusters as part of rewriting the initial query plan to generate an optimized query plan, wherein the optimized query plan executed by the processing cluster.

12. The method of claim 11, wherein executing the plan to perform the database query comprises determining at one of the compute nodes that a size of the database query does not indicate local execution of the database query before sending the request to one of the respective additional processing clusters to perform the one or more operations of the plan.

13. The method of claim 5, wherein at least one operation result corresponding to the one or more operations performed by the additional processing clusters is sent by one of the additional processing clusters to one of the compute nodes that did not instruct the one additional processing cluster.

14. One or more non-transitory, computer-readable storage media, storing program instructions that when executed on or across one or more computing devices cause the one or more computing devices to implement:
receiving a database query at a processing cluster of a database service comprising a plurality of compute nodes that execute different portions of queries to a database;
determining, by the processing cluster, to use respective additional processing clusters of the database service for individual ones of the compute nodes;
generating, by the processing cluster, a plan to perform the database query at the processing cluster, wherein the plan includes one or more operations to instruct individual ones of the compute nodes to use the respective additional processing clusters to perform the one or more operations and return results of the one or more operations to the individual ones of the compute nodes, wherein the respective additional processing clusters respectively implement a same query processing engine, as is implemented by the processing cluster, at an additional leader node and a plurality of additional compute nodes that receive instructions from the additional leader node engine to perform the one or more operations;
executing, by the processing cluster, the plan to perform the database query, comprising sending requests, by the individual ones of the compute nodes, to the respective additional processing clusters to perform the one or more operations of the plan; and
returning, by the processing cluster, a result of the database query.

15. The one or more non-transitory, computer-readable storage media of claim 14, storing further instructions that when executed on or across the one or more computing devices, cause the one or more computing devices to implement:
receiving a second database query at the processing cluster;
generating, by the processing cluster, a plan to perform the second database query at the processing cluster alone;
executing, by the processing cluster, the plan to perform the second database query; and
returning, by the processing cluster, a result of the second database query generated based on the execution of the plan to perform the second database query.

16. The one or more non-transitory, computer-readable storage media of claim 14, wherein the compute nodes are implement on different respective hosts, and wherein individual ones of the respective additional processing clusters are hosted on a same one of the hosts that hosts the compute node that instructed the additional processing cluster.

17. The one or more non-transitory, computer-readable storage media of claim 14, wherein the requests sent to the respective additional processing clusters to perform the one or more operations of the plan are sent over a network from respective hosts for the individual ones of the compute nodes to different hosts that of the additional processing clusters.

18. The one or more non-transitory, computer-readable storage media of claim 14,
wherein, in determining to use the respective additional processing clusters for the individual ones of the compute nodes, the program instructions cause the one or more computing devices to implement
generating, by a leader node of the processing cluster, an initial plan to perform the database query from a query tree generated as a result of parsing the database query;
evaluating, by the leader node of the processing cluster, the initial plan to determine that the respective additional processing clusters are to be used; and
wherein, in generating the plan to perform the database query at the processing cluster, the program instructions cause the one or more computing devices to implement including, by the leader node of the processing cluster, the one or more operations to instruct the individual ones of the compute nodes to use the respective additional processing clusters as part of rewriting the initial query plan to generate an optimized query plan, wherein the optimized query plan executed by the processing cluster.

19. The one or more non-transitory, computer-readable storage media of claim 14, wherein at least one operation result corresponding to the one or more operations performed by the additional processing clusters is sent by one of the additional processing clusters to one of the compute nodes that did not instruct the one additional processing cluster.

20. The one or more non-transitory, computer-readable storage media of claim 14, wherein the processing cluster and the respective additional processing clusters are implemented as part of a data warehouse service offered by a provider network that hosts the database and wherein data for the database is stored in a separate storage service offered by the provider network.

* * * * *